Feb. 12, 1946.    A. B. SIMMONS ET AL    2,394,721
LENS CENTERING DEVICE
Filed March 4, 1943

ARTHUR B. SIMMONS
JOHN H. McLEOD
INVENTORS

BY Newton M. Perrins
J. Griffin Little
ATTORNEYS

Patented Feb. 12, 1946

2,394,721

UNITED STATES PATENT OFFICE 2,394,721

LENS CENTERING DEVICE

Arthur B. Simmons and John H. McLeod, Rochester, N. Y., assignors to Eastman Kodak Company, Rochester, N. Y., a corporation of New Jersey Application March 4, 1943, Serial No. 477,950

12 Claims. (Cl. 88—57)

The present invention relates to a lens centering device and method, and has as its principal object the provision of a method by which a plurality of cemented lens components may be assembled so that the optical axes of all the components will be in alignment or registry to provide a properly centered lens assembly.

A further object of the invention is the provision of an arrangement by which a plurality of lens components may be accurately centered optically prior to edge grinding.

A still further object of the invention is the provision of an arrangement by which successive lens components of a cemented lens assembly may be successively centered relative to the centering device or to the other lens components so that, in the final assembly, the optical axes of all the lens components will be in alignment or registry to provide a properly centered lens assembly.

Yet another object of the invention is the provision of an arrangement by which the various lens components of a cemented lens assembly are successively centered and are then clamped in the centered position, the clamped lens component then cooperating with one of the centering clamping members to accurately center the next lens component so that the various components will be optically aligned to provide a properly centered lens assembly which may be then edge ground as a unit.

Still another object of the invention is the provision of a method of axially centering a plurality of lens components of a cemented lens assembly which is simple, easy to carry out, and highly effective in use.

To these and other ends, the invention resides in certain improvements and combinations of parts, all as will be hereinafter more fully described, the novel features being pointed out in the claims at the end of the specification.

In the drawing.

Similar reference numerals throughout the various views indicate the same parts.

In making up a multiple lens assembly comprising a plurality of lens elements or components which are to be cemented together, it is imperative, for best results, that the optical axes of the various lenses be in alignment optically and mechanically to provide a properly centered lens assembly. The usual method is to center each lens element separately and to then edge grind the lens in accordance with such centering. The individual edge-ground lenses are then assembled. This is accomplished by applying a layer of cement to one of the two lens surfaces to be connected, such lens surfaces being of equal radii of curvature, as is well known. The cemented lens elements are then mounted in a clamp or holder which tightly engages the previously ground edges to retain the lens in proper centered relation until the cement has set. With this arrangement, the optical axes of the various lens components are in alignment or coincide, but it is necessary to perform a separate lens grinding operation on each separate lens element prior to assembly, thus materially increasing the cost of such an assembly.

In order to overcome this difficulty, the present invention provides a method of assembling and simultaneously centering the successive lens elements so that all the lenses will be properly centered and in optical alignment. The centered and assembled lens components are then ground as a unit to provide a properly centered lens assembly. By thus edge grinding the entire assembly, the cost of such grinding is materially reduced, as will be apparent.

Figure 2:
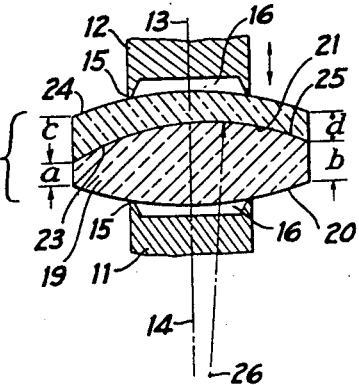
Fig. 2 shows the lens components illustrated in Fig. 1 after the edge grinding operation, showing the variations in marginal thickness of the lenses due to improper centering of the lens components.
Figure 3:
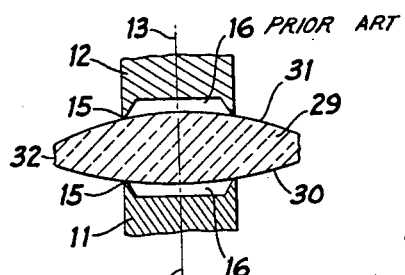
Fig. 3 shows a single lens element which has been properly centered, prior to edge grinding, in accordance with the present invention.
Figure 8:
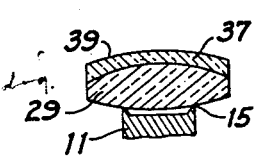
Fig. 8 shows one method of moving one of the lens clamping members to permit the placing of the lens elements therebetween.

The centering of the lens elements is accomplished by means of a pair of clamping members 11 and 12, the axes 13 and 14 of which are in axial alignment, as shown in Figs. 2 to 6. The clamping members are substantially of the same general construction as the clamping members shown and described in the patent to Simmons, No. 2,259,006, issued October 14, 1941, to which reference may be had for a more detailed description, and have annular substantially frictionless contacting surfaces or areas 15 which are concentric with one another and slightly rounded, as shown in Fig. 3 of the above Simmons patent. The portions 16 between the contacting areas 15 are recessed, as shown in Figs. 2 to 6, so that only the areas 15 engage the lens surfaces. The lower member 11 is preferably stationary or fixed while the upper member 12 is axially movable to permit the placing of the lens element in clamping position therebetween. The clamping members are preferably, although not necessarily, non-rotatable. The upper member 12 is provided with a suitable means for moving it toward or away from the lower fixed member 11. Such moving means may comprise, for example, a fluid piston 17 connected to the upper member 12, as shown in Fig. 8. Obviously the upper member 12 may be manually moved if desired.

The Simmons patent shows and describes a device in which a single lens element may be properly centered prior to edge grinding. The applicant utilizes the clamping members shown in this patent to build up a multiple lens component or assembly with all the lens elements properly centered so that the entire lens assembly may be edge ground as a unit. The drawing shows a lens assembly built up of only two cemented lenses, but this is by way of illustration only as it is contemplated, and believed to be obvious, that a larger number of such elements may be assembled, and centered in a manner to be later described.

Figure 1:
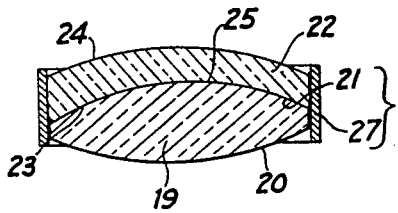
Fig. 1 shows a pair of lens components which have been cemented together prior to edge grinding and without properly centering the individual edge components.

In order to more clearly illustrate the advantages and the desirable features of the applicants' method of centering and assembling lens elements for edge grinding, Figs. 1 and 2 have been incorporated in the drawing. Fig. 1 shows a lens 19 having opposite optically refractive surfaces 20 and 21, and a lens 22 having opposite optically refractive surfaces 23 and 24. The surfaces 21 and 23 are substantially of the same radii of curvature and are connected by a layer of cement 25. If the two lens elements 19 and 22 are thus cemented prior to centering and edge grinding, they might appear as shown in Fig. 1 with the unground marginal edges held in a suitable clamp or holding device 27 until the cement 25 has dried or set.

After the cement has set, the clamp 27 is removed and the cemented lens assembly, shown in Fig. 1 may then be placed in position between the clamping members 11 and 12, the contacting area 15 of the lower member 11 engaging the lower exposed surface 20 of the lens 19, and the area 15 of the upper member 12 engaging the upper surface 24 of the lens 22. If a downward pressure is then exerted on the movable member 12, the double lens assembly will slip laterally until the centers of curvature of the surfaces 20 and 24 will be arranged in alignment with the axes 13 and 14 of the clamping members, as described in the above-mentioned Simmons patent. The attempted centering of the double-lens element is then based entirely on the exposed surfaces 20 and 24 engaged by the clamping members 11 and 12. The cemented surfaces 21 and 23 do not, however, enter into or exert any influence whatever on the centering operation. The result may be, and in most cases will be, that the centers of curvature 26 of the cemented surfaces 21 and 23 will not lie along the axes 14 and 13, as shown in Fig. 2.

Thus the centers of curvature of the cemented surfaces 21 and 23 will not be in alignment with the centers of curvature of the surfaces 20 and 24 with the result that the lenses 19 and 22 are not properly centered or in optical alignment. If such a lens assembly is then edge ground, in the manner well known in the art, it will be found that the edges of the lens 20 will vary in thickness, as shown in $a$ and $b$, and the edges of the lens 22 will be of uneven thickness, as shown at $c$ and $d$ Fig. 2. Due to this variation in edge thickness, the assembly then acts as an optically decentered lens, due to decentering of the surfaces 21 and 23.

Figure 7:
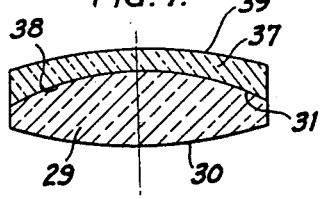
Fig. 7 shows the lens assembly of Fig. 6 after edge grinding, showing the lens components, each of which has a uniform marginal thickness.

In order to overcome these difficulties, the present invention utilizes both surfaces of each lens element during the centering operation. By means of this method the centers of curvatures of all the refractive surfaces of all the lens elements will lie along the axes 12 and 13 so that the optical axes of the lenses coincide with the result that when the complete assembly is edge ground the marginal thickness of the various lenses will be uniform and a perfectly centered lens is obtained, as shown in Fig. 7 and to be later described.

Fig. 3 shows a lens 29 having opposite refractive surfaces 30 and 31 and an unground edge 32. The lens 29 is positioned with the refractive surface 30 engaging the contacting area 15 of the lower stationary member 11. As the upper axially movable member 12 is lowered, the area 15 thereof engages the surface 31 of the lens 19. The clamping members 11 and 12 thus positively engage the opposite refractive surfaces 30 and 31 of the lens 29, and, when downward pressure is applied to the member 12, the lens 19 will slip laterally relative to the clamping members until the centers of curvature of the surfaces 30 and 31 lie along the axis 13 and 14 to thus center the lens 29. Thus not only is the lens 29 thus centered, but also both refractive surfaces 30 and 31 are utilized in the centering operation. This centering action of the clamping members 11 and 12 may be supplemented by a slight manual lateral movement or turning of the lens, or a slight rotation of the member 12.

Figure 4:
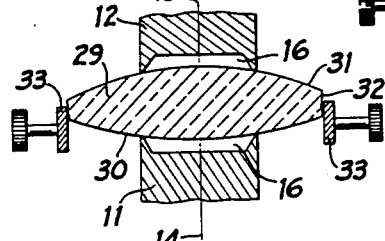
Fig. 4 is a view similar to Fig. 3, but showing one method of clamping the edge of the centered lens to accurately position and retain the latter in its centered position of adjustment.
Figure 5:
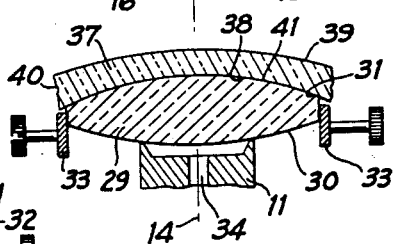
Fig. 5 is a view similar to Fig. 4, but showing the second lens component placed in position on the previously centered lens.

The centered lens 29 is now clamped or held in its centered position of adjustment. Such clamping may be accomplished in any suitable and well known manner as, for example, by moving a plurality of adjustable lugs or clamps 33 into engagement with the unground edge 32, as shown in Fig. 4. This edge clamping means is purely illustrative, as it is contemplated that a wide variety of clamping devices, known to those in the art, may be used. If desired, the clamps 33 may be replaced with or supplemented by a lens holding means in the form of a vacuum applied to the surface 30 to tightly retain the latter in position against the member 11, as shown in Fig. 5. Such a vacuum holding means may be provided by connecting the portion 16 of the member 11 to a suitable source of vacuum, not shown, by means of a conduit 34 formed in the member 11.

The lens 29 is now tightly held in position on the lower clamping member 11, and forms, in effect, and may be broadly considered as a part thereof. The member 11 with its clamped lens 29 cooperates with the upper member 12 to properly center a second lens 37 which is provided with opposite refractive surfaces 38 and 39 and an unground edge 40. The lower surface 38 has substantially the same radius of curvature as the surface 31 of the lens 29 and is positioned thereon and connected thereto by a layer of cement 41; the member 12 of course having been raised to its upper position, as shown in Fig. 5.

When the lenses 29 and 37 are thus assembled, the lens 37 is manually moved relative to the lens 29 to remove any air bubbles which might be present in the cement layer 41. After the bubbles have been thus removed, the upper clamping member 12 is then lowered to the position shown in Fig. 6 to bring the contacting area 15 thereof into engagement with the upper surface 39 of the lens 37. Downward pressure on the member 12 will then cause the lens 37 to slip laterally on the surface 31 of the lens 29 and the area 15 of the upper member 12. This slip will move the lens 37 until the centers of curvature of the upper surface 39 will lie on the axes 12 and 13 and the optical axes of the lower lens 29. However, as the lower surface 38 of the lens 37 has the same radius of curvature as and is concentric with and moves on the upper surface 31 of the lens 29; and, as the surface 31 has been previously centered, the surface 38 will be centered by the surface 31 which acts as a lower centering member so that the center of curvature of the surface 38 will also lie along the axes 14 and 13 and the optical axis of the lens 29. By means of this arrangement, the upper lens 37 has been centered by means of both of its refractive surfaces 38 and 39 so that its optical axis is also in alignment with the optical axis of the lower lens 29. While the assembling of only two lenses has been shown and described, it is apparent that the same procedure may be repeated to connect and center any number of lens elements. Thus both lenses have been properly centered, and both refractive surfaces of each lens were utilized in the centering operation, thus assuring a properly centered assembly.

Figure 6:
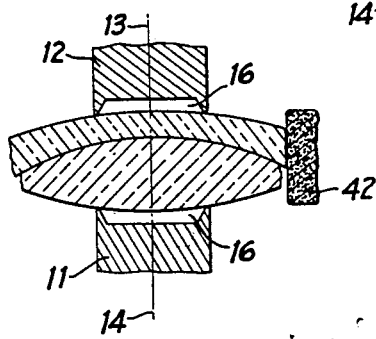
Fig. 6 illustrates the arrangement by which the second lens may be accurately centered relative to the first lens so that the optical axes of the two lens components will be optically and mechanically aligned so that the complete lens assembly may be edge ground as a unit by a grinding wheel.

After the connecting cement layer or layers have set, the assembled and centered lens units may be edge ground while in position between the centering clamps 11 and 12, or the lens unit shown in Fig. 6 may then be edge ground by the usual methods well known to those in the art. However, the device shown in the above-mentioned Simmons patent is admirably adapted for such edge grinding as the usual heating of the lenses and the resulting danger of softening of the cement layer are eliminated, the advantages of which are apparent. Such edge grinding is accomplished by radially moving a rotating grinding wheel, the periphery 42 which is shown in Fig. 6, into engagement with the edges 32 and 40 of the lenses 29 and 37 to simultaneously edge grind both lenses as a unit. Due to the fact that both lenses 29 and 37 are in optical alignment, when the edge grinding operation is completed the final lens assembly will then appear as illustrated in Fig. 7 in which each lens has a uniform marginal thickness. Such uniform thickness provides an optically centered lens assembly, the advantages of which will be readily apparent to those in the art.

The present invention thus provides a method of assembling the plurality of lenses prior to edge grinding, and properly aligning said lenses so that the optical axes of all the lenses will coincide or be in optical and mechanical alignment. Such a result is secured by separately centering each lens element with relation to both of its refractive surfaces. When the lens elements are thus centered, cemented and edge ground, each lens has a uniform peripherial or marginal thickness to provide an optically centered lens assembly.

While certain embodiments of the invention have been disclosed, it is to be understood that the inventive idea may be carried out in a number of ways. This application is, therefore, not to be limited to the precise details described, but is intended to cover all variations and modifications thereof falling within the scope of the appended claims.

We claim:

1. A device for mechanically centering lens components having adjacent surfaces of substantially equal radii of curvature adapted to be connected by a layer of cement, comprising a pair of aligned lens-centering clamping members having annular, substantially frictionless contacting areas concentric with each other, one of said areas engaging one surface of one of said lens components while the other over engages the opposite surface thereof and cooperation with said one area to shift said one component laterally to mechanically center the latter so that the optical axis thereof will be in registry with the axes of said members, means acting directly on said one component to retain the latter in its centered position and means for axially moving said other area out of contact with said one component to permit a second component to be placed thereon with said surface of equal radii arranged adjacent to each other and connected by said layer of cement, said movable area being then movable into engagement with the outer surface of said second component to cooperate with said equal radius surface of said first component to shift said second component laterally relative thereto to mechanically center the latter so that the optical axis of the second component coincides with the optical axis of said first component.

2. A device for mechanically centering lens components having adjacent surfaces of substantially equal radii of curvature adapted to be connected by a layer of cement, comprising a pair of aligned lens-centering clamping members having annular, substantially frictionless contacting areas concentric with each other, one of said areas engaging one surface of one of said lens components while the other engages the opposite surface thereof and cooperates with said one area to shift said one component laterally to mechanically center the latter so that the optical axis thereof will be in registry with the axes of said members, means for holding said one component to retain the latter positively in its centered position of adjustment, and means for axially moving said other area out of contact with said one component to permit a second component to be placed thereon with said surface of equal radii arranged adjacent to each other and connected by said layer of cement, said movable area being then movable into engagement with the outer surface of the second component to cooperate with said equal radius surface of said first component to shift said second component laterally relative thereto to mechanically center the latter so that the optical axis of the second component coincides with the optical axis of said first component.

3. A device for mechanically centering lens components having adjacent surfaces of substantially equal radii of curvature adapted to be connected by a layer of cement, comprising a pair of aligned lens-centering clamping members having annular, substantially frictionless contacting areas concentric with each other, one of said areas engaging one surface of one of said lens components while the other engages the opposite surface thereof and cooperates with said one area to shift said one component laterally to mechanically center the latter so that the optical axis thereof will be in registry with the axis of said members, a clamp movable into engagement with the periphery of said one component to positively retain the latter in its centered position of adjustment, and means for axially moving said other area out of contact with said one component to permit a second component to be placed thereon with said surfaces of equal radii arranged adjacent to each other and connected by said layer of cement, said movable area being then movable into engagement with the outer surface of said second component to cooperate with said equal radius surface of said first component to shift said second component laterally relative thereto to mechanically center the latter so that the optical axis of the second component coincides with the optical axis of said first component.

4. A device for mechanically centering lens components having adjacent surfaces of substantially equal radii of curvature adapted to be connected by a layer of cement, comprising a pair of aligned lens-centering clamping members having annular, substantially frictionless contacting areas concentric with each other, one of said areas engaging one surface of one of said lens components while the other engages the opposite surface thereof and cooperates with said one area to shift said one component laterally to mechanically center the latter so that the optical axis thereof will be in registry with the axis of said members, fluid pressure means associated with said one area and acting on said one surface of said one component to positively retain the latter in its centered position, and means for axially moving said other area out of contact with said one component to permit a second component to be placed thereon with said surfaces of equal radii arranged adjacent to each other and connected by said layer of cement, said movable area being then movable into engagement with the outer surface of said second component to cooperate with said equal radius surface of said first component to shift said second component laterally relative thereto to mechanically center the latter so that the optical axis of the second component coincides with the optical axis of said first component.

5. A device for mechanically centering lens components having adjacent surfaces of substantially equal radii of curvature adapted to be connected by a layer of cement, comprising a pair of aligned lens-centering clamping members having annular, substantially frictionless contacting areas concentric with each other, one of said areas engaging one surface of one of said lens components while the other engages the opposite surface thereof and cooperates with said one area to shift said one component laterally to mechanically center the latter so that the optical axis thereof will be in registry with the axis of said members, means for holding said one component to retain positively the latter in its centered position of adjustment, and means for axially moving said other area out of contact with said one component to permit a second component to be placed thereon with said surfaces of equal radii arranged adjacent to each other and connected by said layer of cement, said movable area being then movable into engagement with the outer surface of said second component to cooperate with said equal radius surface of said first component to shift said second component laterally relative thereto to mechanically center the latter so that the optical axis of the second component coincides with the optical axis of said first component, and means for simultaneously edge grinding both of said centered components as a unit.

6. A device for mechanically centering lens components having adjacent surfaces of substantially equal radii of curvature adapted to be connected by a layer of cement, comprising a pair of aligned lens-centering clamping members having annular, substantially frictionless contacting areas concentric with each other, one of said areas engaging one surface of one of said lens components while the other engages the opposite surface thereof and cooperates with said one area to shift said one component laterally to mechanically center the latter so that the optical axis thereof will be in registry with the axis of said members, a clamp movable into engagement with the periphery of said one component to positively retain the latter in its centered position of adjustment, and means for axially moving said other area out of contact with said one component to permit a second component to be placed thereon with said surfaces of equal radii arranged adjacent to each other and connected by said layer of cement, said movable area being then movable into engagement with the outer surface of said second component to cooperate with said equal radius surface of said first component to shift said second component laterally relative thereto to mechanically center the latter so that the optical axis of the second component coincides with the optical axis of said first component, and a grinding wheel movable into engagement with the edges of both of said centered components to simultaneously edge grind said components as a unit.

7. The method of mechanically centering lens components, each component having two refractive surfaces, comprising placing one of the components with one refractive surface thereof engaging a rounded annular contacting area formed on a clamping member, axially moving a second clamping member arranged in axial alignment with said first clamping member to bring a rounded-annular contacting area of said second clamping member into engagement with the opposite refractive surface of said lens component, applying axial pressure on said second clamping member to cause the lens component engaged thereby to slip laterally until all points on both annular contacting areas engage the respective surfaces to center said components so that the optical axis thereof will coincide with the axes of said clamping members, moving said second clamping member away from said component to disengage said second contacting area from said opposite surface, applying a layer of cement to said opposite surface, placing a refractive surface of a second lens component into engagement with the cement layer on said opposite surface, the surfaces of said components connected by said cement being of substantially equal radii of curvature, moving said second clamping member toward said second lens to bring said second contacting area into engagement with the other refractive surface of said second lens component, applying axial pressure to said second clamping member to cause said second lens to slip laterally relative to said second contacting area and said opposite surface of said first lens component until all points on said second contacting area engage the other surface of said component to center the latter so that the optical axis thereof lies in registry with the optical axis of said first component.

8. The method of mechanically centering lens components, each component having two refractive surfaces, comprising placing one of the components with one refractive surface thereof engaging a narrow rounded annular contacting area formed on a clamping member, axially moving a second clamping member arranged in axial alignment with said first clamping member to bring a narrow rounded annular contacting area of said second clamping member into engagement with the opposite refractive surface of said lens component, applying axial pressure on said second clamping member to cause the lens component engaged thereby to slip laterally until all points on both annular contacting areas engage the respective surfaces to center said components so that the optical axis thereof will coincide with the axes of said clamping members, clamping said first component to retain positively said first component in its centered position, moving said second clamping member away from said component to disengage said second contacting area from said opposite surface, applying a layer of cement to said opposite surface, placing a refractive surface of a second lens component into engagement wtih the cement layer on said opposite surface, the surfaces of said components connected by said cement being of substantially equal radii of curvature, moving said second clamping member toward said second lens to bring said second contacting area into engagement with the other refractive surface of said second lens components, applying axial pressure to said second clamping member to cause said second lens to slip laterally relative to said second contacting area and said opposite surface of said first lens component until all points on said second contacting area engage the other surface of said second component to center the latter so that the optical axis thereof lies in registry with the optical axis of said first component.

9. The method of mechanically centering lens components, each component having two refractive surfaces, comprising placing one of the components with one refractive surface thereof engaging a narrow rounded annular contacting area formed on a clamping member, axially moving a second clamping member arranged in axial alignment with said first clamping member to bring a narrow rounded annular contacting area of said second clamping member into engagement with the opposite refractive surface of said lens component, applying axial pressure on said second clamping member to cause the lens component engaged thereby to slip laterally until all points on both annular contacting areas engage the respective surfaces to center said components so that the optical axis thereof will coincide with the axes of said clamping members, clamping the marginal edge of said first component to hold positively said first component in its centered position, moving said second clamping member away from said component to disengage said second contacting area from said opposite surface, applying a layer of cement to said opposite surface, placing a refractive surface of a second lens component into engagement with the cement layer on said opposite surface, the surfaces of said components connected by said cement being of substantially equal radii of curvature, moving said second clamping member toward said second lens to bring said second contacting area into engagement with the other refractive surface of said second lens component, applying axial pressure to said second clamping member to cause said second lens to slip laterally relative to said second contacting area and said opposite surface of said first lens component until all points on said second contacting area engage the other surface of said second component to center the latter so that the optical axis thereof lies in registry with the optical axis of said first component.

10. The method of mechanically centering lens components, each component having two refractive surfaces, comprising placing one of the components with one refractive surface thereof engaging a narrow rounded annular contacting area formed on a clamping member, axially moving a second clamping member arranged in axial alignment with said first clamping member to bring a narrow rounded annular contacting area of said second clamping member into engagement with the opposite refractive surface of said lens component, applying axial pressure on said second clamping member to cause the lens component engaged thereby to slip laterally until all points on both annular contacting areas engage the respective surfaces to center said components so that the optical axis thereof will coincide with the axes of said clamping members, applying a holding pressure to said one refractive surface of said first component to maintain said first component in its centered position, moving said second clamping member away from said component to disengage said second contacting area from said opposite surface, applying a layer of cement to said opposite surface, placing a refractive surface of a second lens component into engagement with the cement layer on said opposite surface, the surfaces of said components connected by said cement being of substantially equal radii of curvature, moving said second clamping member toward said second lens to bring said second contacting area into engagement with the other refractive surface of said second lens component, applying axial pressure to said second clamping member to cause said second lens to slip laterally relative to said second contacting area and said opposite surface of said first lens component until all points on said second contacting area engage the other surface of said second component to center the latter so that the optical axis thereof lies in registry with the optical axis of said first component.

11. The method of mechanically centering and edge-grinding lens components, each component having two refractive surfaces, comprising placing one of the components with one refractive surface thereof engaging a narrow rounded annular contacting area formed on a clamping member, axially moving a second clamping member arranged in axial alignment with said first clamping member to bring a narrow rounded annular contacting area of said second clamping member into engagement with the opposite refractive surface of said lens component, applying axial pressure on said second clamping member to cause the lens component engaged thereby to slip laterally until all points on both annular contacting areas engage the respective surfaces to center said components so that the optical axis thereof will coincide with the axes of said clamping members, moving said second clamping member away from said component to disengage said second contacting area from said opposite surface, applying a layer of cement to said opposite surface, placing a refractive surface of a second lens component into engagement with the cement layer on said opposite surface, the surfaces of said components connected by said cement being of substantially equal radii of curvature, moving said second clamping member toward said second lens to bring said second contacting area into engagement with the other refractive surface of said second lens component, applying axial pressure to said second clamping member to cause said second lens to slip laterally relative to said second contacting area and said opposite surface of said first lens component until all points on said second contacting area engage the other surface of said second component to center the latter so that the optical axis thereof lies in registry with the optical axis of said first component, and simultaneously edge-grinding both centered lens components as a unit while clamped and positioned between the two clamping members.

12. The method of mechanically centering and edge-grinding lens components, each component having two refractive surfaces, comprising placing one of the components with one refractive surface thereof engaging a narrow rounded annular contacting area formed on a clamping member, axially moving a second clamping member arranged in axial alignment with said first clamping member to bring a narrow rounded annular contacting area of said second clamping member into engagement with the opposite refractive surface of said lens component, applying axial pressure on said second clamping member to cause the lens component engaged thereby to slip laterally until all points on both annular contacting areas engage the respective surfaces to center said components so that the optical axis thereof will coincide with the axes of said clamping members, clamping said first component to retain positively said first component in its centered position, moving said second clamping member away from said component to disengage said second contracting area from said opposite surface, applying a layer of cement to said surface, placing a refractive surface of a second lens component into engagement with the cement layer on said opposite surface, the surface of said components connected by said cement being of substantially equal radii of curvature, moving said second clamping member toward said second lens to bring said second contacting area into engagement with the other refractive surface of said second lens component, applying axial pressure to said second clamping member to cause said second lens to slip laterally relative to said second contacting area and said opposite surface of said first lens component until all points on said second contacting area engage the other surface of said second component to center the latter so that the optical axis thereof lies in registry with the optical axis of said first component, and applying a grinding wheel to the edges of said pair of centered components to simultaneously edge-grind both components as a unit.

ARTHUR B. SIMMONS.
JOHN H. McLEOD.